United States Patent Office 2,826,598
Patented Mar. 11, 1958

2,826,598
PRODUCTION OF ORGANIC COMPOUNDS OF ALUMINUM AND BERYLLIUM

Karl Ziegler and Hans-Georg Gellert, Mulheim (Ruhr), Germany

No Drawing. Application June 17, 1952
Serial No. 294,065

Claims priority, application Germany June 21, 1951

31 Claims. (Cl. 260—448)

This invention relates to improvements in the production of organic compounds of aluminum and beryllium. It is based on the discovery that compounds of the general formula $Me(R)_n$, wherein Me represents one of the two above metals, and R represents a hydrogen atom or a monovalent saturated aliphatic radical or aromatic radical in any desired combination, and $n$ represents the valency of the metal, can form addition products with olefins. The compounds of the type $Me(R)_n$ can also be employed for this in the form of their molecular compounds with ethers, thioethers or tertiary amines, and also in the form of their complex compounds with alkali hydrides, alkali alkyls and alkali aryls. The starting materials for the process of the invention, therefore, include the following:

$AlH_3$, aluminum hydride
$LiAlH_4$, lithium aluminum hydride
$AlH_2R$, aluminum alkyl dihydrides
$AlHR_2$, aluminum dialkyl hydrides
$AlR_3$, aluminum trialkyls (-aryls)
$LiAlR_4$, lithium aluminum tetraalkyls
$NaAlHR_3$, sodium aluminum trialkyl hydrides, and similar compounds, also aluminum trialkyl etherates
$BeH_2$, beryllium hydride
$BeHR$, beryllium alkyl hydrides
$BeR_2$, beryllium dialkyls
Beryllium dialkyl etherates and similar molecular compounds of tertiary amines and thioethers.

The chemical compounds formed in accordance with the invention are organic compounds of aluminum and beryllium, including molecular compounds thereof with ethers, thioethers, tertiary amines and including complex compounds thereof with alkali hydrides, alkali alkyls and alkali aryls. In these compounds at least one valence bond of the metal aluminum or beryllium is bound to a group having the general formula $(R)_mR'$, in which R is a bivalent hydrocarbon radical such as an alkylene, alkenylene, aralkenylene, or cyclo alkylene radical, and R' may be hydrogen, monovalent saturated aliphatic radicals, or aromatic radicals. The other valences of the aluminum of beryllium metal may be bound with the same or different groups having the same general formula $(R)_mR'$, or may be bound by R or R' in any combination. In the formula, $m$ is a number from 1 to 6.

Unsaturated hydrocarbons can be added in simple whole-number proportions to all these compounds.

If $$\frac{Me}{n}$$

is one equivalent of the metal Me of the valency $n$ and is designated by "$me$"

$$\left(\frac{Me}{n}=me\right)$$

the products of the process of the invention in the over-whelming majority of cases have the empirical formula $me$.olefin.R (wherein R has the above-indicated meaning); and in the case of diolefins have the empirical formula $me$.diolefin.R or $me_2$.diolefin.$R_2$ (correspondingly in the case of poly-olefins). everal olefin molecules can, however, be added to one $me$.R, thus giving products of the empirical formula $me$(olefin)$_m$R, wherein $m$ represents a small whole number from 1 to about 6.

The process will first be illustrated by a simple example: A solution of aluminum hydride in ether (preferably 0.6 molar) is introduced into an autoclave and dry, air-free ethylene is forced in, preferably in a multiple of the equivalent quantity of 3 mols. The mixture is then heated cautiously to approximately 70–80° C.; at a higher temperature there would be the danger of the aluminum hydride decomposing. A fall in pressure is very soon observed, and the pressure again becomes approximately constant when 3 mols of ethylene have been taken up per mol of aluminum hydride. When the excess of ethylene is blown off, the autoclave is emptied in an atmosphere of nitrogen and the reaction product is worked up, the known compound aluminum triethyl etherate $Al(C_2H_5)_3 \cdot \tfrac{3}{4}O(C_2H_5)_2$ can very readily be isolated in almost quantitative yield.

Thus the following reaction has taken place:

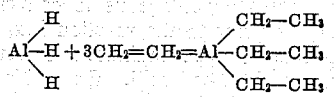

The reaction takes an entirely similar course when a start is made from an ethereal solution of aluminum lithium hydride. The known lithium aluminum tetraethyl crystallizes from the reaction mixture directly, or on concentration in an atmosphere of nitrogen. It proves to be completely identical with a product produced from lithium ethyl and aluminum tri-ethyl.

All the olefins of the type $R'—CH=CH_2$ and

(R' and R"=alkyl, alkenyl, aralkyl or cyclo-alkyl, R' and R" being the same or different) can be converted with aluminum hydride in a wholly analogous manner into the corresponding aluminum compounds.

The following table sets out aluminum compounds produced in this way, almost all of which are new:

| Starting material | Product (as the etherate) |
|---|---|
| $CH_3.CH=CH_2$ | $(CH_3.CH_2.CH_2)_3Al$ |
| $CH_3.CH_2.CH_2.CH=CH_2$ | $(CH_3.CH_2.CH_2.CH_2.CH_2)_3Al$ |
| $\begin{array}{c}CH_3\\ \phantom{CH_3}\diagdown\\ \phantom{CH_3CH}C=CH_2\\ \phantom{CH_3}\diagup\\ CH_3\end{array}$ | $[(CH_3)_2.CH.CH_2]_3Al$ |
| $\begin{array}{c}C_4H_9\\ \phantom{C_4H_9}\diagdown\\ \phantom{C_4H_9CH}C=CH_2\\ \phantom{C_4H_9}\diagup\\ C_2H_5\end{array}$ | $\left[\begin{array}{c}C_4H_9\\ \phantom{C_4H_9}\diagdown\\ \phantom{C_4H_9C}CH—CH_2\\ \phantom{C_4H_9}\diagup\\ C_2H_5\end{array}\right]_3 Al$ |
| $CH_3(CH_2)_9.CH=CH_2$ | $[CH_3.(H_2)_{10}.CH_2]_3Al$ |
| ⬡—$CH=CH_2$ | $\left[\text{⬡}—CH_2.CH_2\right]_3 Al$ |
| $\begin{array}{c}CH_3.(CH_2)_{11}\\ \phantom{CH_3}\diagdown\\ \phantom{CH_3CH}C=CH_2\\ \phantom{CH_3}\diagup\\ CH_3.(CH_2)_9\end{array}$ | $\left[\begin{array}{c}CH_3.(CH_2)_{11}\\ \phantom{CH_3}\diagdown\\ \phantom{CH_3C}CH—CH_2\\ \phantom{CH_3}\diagup\\ CH_3.(CH_2)_9\end{array}\right]_3 Al$ |

These compounds are obtained in the first place in the form of their very stable etherates. If it is desired to obtain the ether-free products, which differ from the etherates in many respects, for example in their catalytic effectiveness, then one of the following processes must be adopted:

(1) The aluminum hydride is freed as far as possible from ether before reaction with the ethylene. For this purpose the ethereal solution of aluminum hydride is evaporated until the hydride remains as a solid residue and this residue is freed from ether as far as possible by careful heating in vacuo. As described by Finholt, Bond and Schlesinger (Journ. Am. Chem. Soc., vol. 69, 1202 (1947)) it is possible to proceed in this way to a molecular ratio of hydride to ether of approximately 5:1. Under the above-described conditions, this solid aluminum hydride also adds on olefins to form aluminum trialkyls, which are then largely free from ether. In this case the solid hydride can be reacted directly with the olefins at temperatures of about 70 to 90° C. In many cases, for example in the case of propylene, this is not advisable, however, since the addition of aluminum hydride to olefins takes place with spontaneous evolution of heat, so that unless one works very carefully, a lively spontaneous reaction can set in with increase of temperature to more than 100° C., which then destroys a part of the aluminum hydride by decomposition into hydrogen and aluminum and it is, therefore, advantageous to suspend the aluminum hydride in pentane or another indifferent solvent.

It has also proved advantageous to convert the solid aluminum hydride prior to the reaction into a very fine suspension in one of these indifferent solvents, for example, by grinding in a ball mill. From this suspension, even the last traces of ether can be removed, if desired, by distilling off the suspension medium, while continually making up the evaporated liquid, so as to obtain practically ether-free aluminum trialkyls after the reaction with the olefin. This distillation operation can also be carried out under reduced pressure, especially when a solvent is employed, having a boiling point higher than 80° C., for example, toluene, xylene, decahydronaphthalene, or the like.

(2) Instead of working in ethereal solution, it is possible to obtain aluminum alkyls free from ether by proceeding as follows: An ethereal solution of a complex aluminum alkali tetra-alkyl is first produced either by starting from an ethereal solution of lithium aluminum hydride, and not from an ethereal solution of aluminum hydride, for the addition of the olefin, or by first adding the olefin to ethereal aluminum hydride and then converting the aluminum trialkyl in the solution to aluminum trialkyl etherate. Thereafter, this etherate is converted into the complex alkali trialkyl aluminum hydride by the addition of a calculated quantity of a suspension of lithium hydride or sodium hydride. On subsequent treatment with the olefin, the complex alkali trialkyl aluminum hydride is converted into aluminum alkali tetra-alkyl.

These complex compounds are much more stable to heat than is aluminum hydride, and can readily be freed from all traces of ether by evaporating the solvent and heating in vacuo to temperatures of 100 to 120° C. If they are then dissolved or suspended in a non-ethereal solvent, such as hexane or another saturated aliphatic hydrocarbon, they can be reacted in this solvent with ⅓ mol of aluminum halide, whereupon the following reaction takes place: $AAlH_4 + ⅓ AlX_3 = 1⅓ AlR_3 + AX$ (A=alkali metal, X=halogen). This process can also serve to convert into ether-free aluminum trialkyls, aluminum trialkyl etherates, which have been produced in a manner different from the herein-described process of the invention, for example, from aluminum magnesium alloys and alkyl halides in ether. This possibility is specifically mentioned here because the addition of the olefin to the complex alkali aluminum trialkyl hydride takes place according to the process of the invention, and this possibility of converting the very readily accessible and very stable aluminum trialkyl etherates into ether-free compounds represents an important application of the process of the invention.

(3) According to another modification of the process, the reaction between the olefin and aluminum hydride is interrupted before 3 molecules of the olefin have been taken up. For example, when ethylene is used, if the reaction vessel is cooled at the instant at which the fall in pressure indicates that 1 to 1.5 mols of ethylene have been used up, then the reaction product consists mainly of mixtures of $H_2Al(C_2H_5)$ and $HAl(C_2H_5)_2$, from which the compound $HAl(C_2H_5)_2$ first passes over on careful distillation in as high a vacuum as possible (colorless liquid of density $d_4^{20}=0.808$ and refractive index $n_D^{20}=1.47396$, which ignites spontaneously in the air). These alkyl aluminum hydrogen compounds do not form stable etherates. They are also much more stable to heat than is aluminum hydride. It is, therefore, possible to obtain these products completely free from ether by suitable heating in high vacuo or also by distillation in high vacuo and then to convert them with freshly added olefins into ether-free aluminum trialkyls. It is obvious that mixed aluminum trialkyls can also be produced via these compounds, by choosing for employment in the second stage a different olefin from that employed in the first stage.

In this case it is not necessary, however, to produce the alkyl aluminum hydrogen compounds in the above-described way from olefins and aluminum hydride. These products can also be obtained in other ways. Since these compounds, as already mentioned, are considerably more stable to heat than is aluminum hydride itself, by means of them it is also possible to link secondary residues by means of 1.2-disubstituted ethylenes with aluminum in good yields to form mixed aluminum trialkyls. Thus, there are no special difficulties in producing aluminum diethyl-secondary-butyl from $(C_2H_5)_2AlH$ and $$CH_3.CH=CH.CH_3$$

in an autoclave (72 hours, 70° C. in the absence of solvents).

In all the above-considered reactions the residue al—H is added on to olefins, the symbol "al" representing one-third of a molecule of aluminum. The al—C group, however, which is characteristic of aluminum trialkyls and aluminum triaryls, has the same power of forming addition compounds with olefins. Thus, the higher aluminum compounds

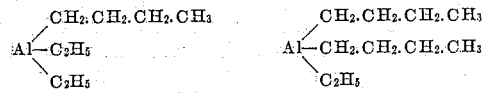

and

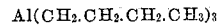

aluminum diethyl butyl, aluminum ethyl dibutyl and aluminum tributyl, can be formed successively from ethylene and aluminum tri-ethyl in just the same way as aluminum tri-ethyl is finally formed from aluminum hydride and ethylene via two intermediate stages.

The feature which is completely analogous in both processes is the conversion in each case of an aluminum compound of relatively low molecular weight into an aluminum compound of higher molecular weight by the addition of an olefin. This addition takes place more slowly than the addition of aluminum compounds containing hydrogen, and consequently in the case of reacting aluminum hydride with ethylene, the al—H group is first converted and only then are the substituents built up from ethyl to butyl, etc. This process is preferably carried out at rather higher temperatures than in the case of hydrogen-containing aluminum compounds. A temperature of 100 to 140° C. has proven advantageous.

It is obvious that when ethylene is added to aluminum tri-ethyl, it is not possible to carry out the individual stages of building up the final compound in a manner sharply distinguished one from the other, since the processes shown on paper as taking place successively, also proceed concurrently, so that in a reaction mixture of this kind, after one mol of ethylene has been absorbed, aluminum dibutyl ethyl can already be detected, besides the aluminum butyl di-ethyl, which is mainly formed, so that a corresponding proportion of aluminum tri-ethyl still remains unchanged. It is also obvious that the reactivity of the al—C group, which makes possible the addition of olefins, cannot be independent of the residue attached to al, for instance, aluminum tributyl, under the above-indicated conditions, i. e., at 100 to 140° C., can give aluminum hexyl dibutyl, aluminum dihexylbutyl, and aluminum trihexyl. Quite generally, therefore, mixtures are formed of aluminum compounds of the formula:

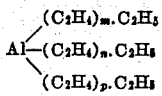

wherein $m$, $n$, $p$ represent small whole numbers of up to about 6, the average value of which is dependent on the total quantity of ethylene absorbed by the aluminum trialkyl, and this can be controlled in a simple way by observing the reduction in the pressure of the ethylene which is preferably employed in the compressed state. It also depends, of course, on the reaction period.

When the experimental temperature is increased above about 140° C., the velocity with which ethylene is taken up is certainly very high, but decomposition simultaneously takes place as well to an increasing degree, and to an increasing degree reaction products are formed which are no longer aluminum trialkyls. In order to carry out the process of the invention successfully, it is, therefore, essential to keep the experimental conditions and the quantitative course of the reaction well under control, which can be done on the one hand by not allowing the temperature to rise too far above the temperature zone in which the reactions begin to proceed at all at a perceptible speed, and by choosing as the upper temperature limit substantially the temperature which permits of velocities which are still utilizable on a technical scale. This upper limit is approximately 140° C. in the case of the reaction of ethylene with aluminum triethyl; it varies from case to case, but can in any particular case be determined readily by one skilled in the art by a few preliminary experiments. For the synthesis of aluminum trialkyls from aluminum hydride, it is approximately 80° C. so long as unchanged hydride is still present, and in the case of the addition of alkyl aluminum hydrogen compounds, it is higher at 100 to 120° C. In this case also, however, it is unwise to exceed the limit of 100° C. when it is desired to stop the reaction at the stage of addition exclusively to all the al—H group.

It lies in the nature of the present invention that the same substances can occur either as starting materials or as end products, i. e., as products of the process. Thus, ethylene can be added to aluminum tripropyl produced in conventional manner, thus converting it mainly into $Al(C_5H_{11})_3$. On the other hand, the same aluminum tripropyl can also be the product of the process, when, for example, aluminum trimethyl is combined with ethylene, or aluminum hydride is combined with propylene.

The addition of aluminum trialkyls to olefins takes place particularly smoothly and readily in the case of ethylene itself, and also in the case of all mono-alkyl-substituted ethylenes (alpha olefins). In this case the nature of the substituted product has comparatively little effect. The latter must only not contain components which react with the sensitive aluminum compounds to decompose them. Thus, for example, the above-described addition reactions take place very successfully with vinyl cyclo-hexene, when it is principally the vinyl group

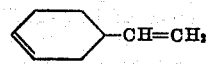

which reacts. Olefins with an intermediate double bond, such, for example, as butene-(2) or cyclohexene, are less reactive and require long reaction periods, unless the double bond is distinguished by increased activity, as in the case of dicyclopentadiene,

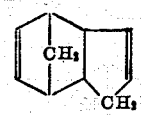

the left-hand bond of which as shown above adds on aluminum trialkyl very readily (and, of course, also aluminum hydride and the like). Aluminum trialkyls are less readily added to isobutylene and in general to 1.1-dialkylated ethylenes such as

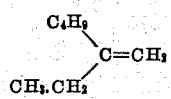

and the like. If it is desired to build up high molecular weight organo-metallic compounds from these, then it is best to use beryllium dialkyls, which are, of course, much more valuable than the aluminum compounds, and in general react quite similarly to the aluminum trialkyls, but are added very readily to 1.1-dialkylated olefins, for example

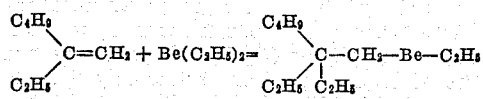

A priori all the aluminum and beryllium compounds here mentioned could be added in two different directions to all unsymmetrical olefins. It has been found that the addition products always contain the metal atoms on the carbon atom which is richest in hydrogen, i. e., alpha olefins always form practically exclusively products with the metal on the $CH_2$— group, for example,

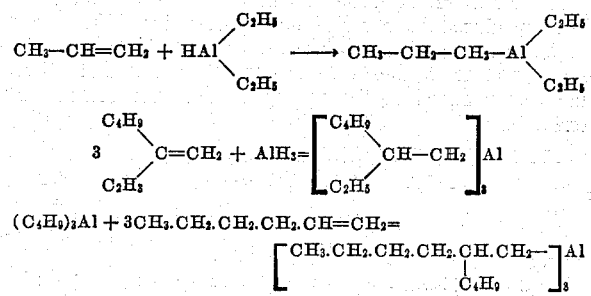

The organic aluminum and beryllium compounds, which can be obtained in great numbers and with great possibilities of variation by the above-described processes, are primarily of importance as polymerization catalysts for olefins. They also have a considerable interest as intermediate products for further reactions. Some of their applications are mentioned here. Decomposition with water, dilute acids or the like, liberates the organic substances in the form of hydrocarbons:

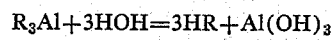

Insofar as the aluminum alkyls or alkali aluminum tetraalkyls have been produced from olefins by addition of $AlH_3$, $LiAlH_4$ or the like, the successive reactions represent a hydrogenation of the olefin. Of course, there are simpler methods of hydrogenation, and normally these new possibilities of hydrogenating olefins opened up by the reactions here described will not be used. On the other hand, these new possibilities may be used with advantage in the selective hydrogenation of certain types of olefins (for example, $R'$—$CH=CH_2$ and $R'_2C=CH_2$) in mixtures with other less reactive olefins or for the partial hydrogenation of di-olefins with two different types of double bonds. Examples of this are the conversion of vinyl cyclohexene $$\text{C}_6\text{H}_9\text{-CH=CH}_2$$

into ethylene cyclohexene $$\text{C}_6\text{H}_9\text{-CH}_2\text{-CH}_3$$

and of (bicyclic diolefin structure with CH$_2$ groups)

into (bicyclic structure with additional CH$_2$ groups)

In this connection it should be mentioned that one double bond in the fulvenes, for example, dimethyl fulvene, reacts very readily with the group al—H (al=⅓Al) so that by decomposing with water addition products produced according to the invention dihydrofulvenes are obtained of a constitution not yet further known.

In the case of valuable and sensitive olefins and di- and poly-olefins, in order to ensure as smooth as possible a partial hydrogenation, it has proven advantageous first to produce the addition products according to the invention with $CH_3.AlH_2$ or $(C_2H_5)_2AlH$, since the addition of these often takes place more smoothly than that of $AlH_3$ or $LiAlH_4$. The decomposition of the addition products then leads both to the formation of partially hydrogenated substances containing a plurality of unsaturated bonds and also to the evolution of methane or ethane, which has no disadvantages, however, apart from an only partial utilization of the aluminum atoms for the hydrogenations.

Insofar as the addition products of the invention have been produced from aluminum or beryllium alkyls and olefins, decomposition with water gives products in which it appears from the formula that hydrogen and alkyl have been added to the double bond of the olefin, for example, $$\text{al.CH}_2.\text{CH}_2.\text{CH}_2.\text{CH}_3 + \text{CH}_3(\text{CH}_2)_9.\text{CH=CH}_2 =$$

$$\text{CH}_3(\text{CH}_2)_9.\overset{|}{\underset{\text{C}_4\text{H}_9}{\text{CH}}}.\text{CH}_2.\text{al} \longrightarrow \text{CH}_3(\text{CH}_2)_9.\overset{|}{\underset{\text{C}_4\text{H}_9}{\text{CH}}}.\text{CH}_3$$

$$\underset{\text{C}_2\text{H}_5}{\overset{\text{C}_4\text{H}_9}{>}}\text{C=CH}_2 + \text{be.C}_2\text{H}_5 = \underset{\text{C}_2\text{H}_5\ \text{C}_2\text{H}_5}{\overset{\text{C}_4\text{H}_9}{>}}\text{C-CH}_2.\text{be} \longrightarrow \underset{\text{C}_2\text{H}_5\ \text{C}_2\text{H}_5}{\overset{\text{C}_4\text{H}_9}{>}}\text{C-CH}_3$$

Special reference may be made to the simple synthesis of hydrocarbons with quaternary carbon atoms by means of beryllium alkyls in accordance with the second equation. To this extent, therefore, the addition products of the invention provide possibilities of synthesis susceptible of great variation of unitary hydrocarbons of predetermined structure. Since the compound $$\text{al.CH}_2.\text{CH}_2.\text{CH}_2.\text{CH}_3$$

used in the reaction shown by the first of the last two equations above can be produced from alpha-butylene and AlH, the reaction makes possible the synthesis of the hydrocarbon $$\text{CH}_3(\text{CH}_2)_9.\overset{|}{\underset{\text{C}_4\text{H}_9}{\text{CH}}}.\text{CH}_3$$

from alpha-butylene and alpha-dodecylene.

These possibilities are reminiscent of the Grignard reaction, but no substances with C=O, C=N or the like groups are required as starting materials, such as are characteristic of the reactants for the Grignard compounds.

While the addition products of the invention are obviously of importance for the synthesis of hydrocarbons, their role is in no way limited to this. Decomposition of the products of the process with halogens—iodine, bromine, chlorine—leads, for example, to halogeno-paraffins, and it is worthy of note that the following reaction can, for example, be carried out in this way:

$$\underset{\text{C}_2\text{H}_5}{\overset{\text{C}_4\text{H}_9}{>}}\text{C=CH}_2 + \text{alH} = \underset{\text{C}_2\text{H}_5}{\overset{\text{C}_4\text{H}_9}{>}}\text{CH-CH}_2\text{-al} + \text{Br}_2$$

(al=one-third Al) ↓

$$\underset{\text{C}_2\text{H}_5}{\overset{\text{C}_4\text{H}_9}{>}}\text{CH-CH}_2.\text{Br} + \text{Br.al}$$

i. e., in this way it is possible to add HBr indirectly to the olefin in a direction opposite to the direction of the direct addition, which always goes to $$\underset{\text{C}_2\text{H}_5\ \text{Br}}{\overset{\text{C}_4\text{H}_9}{>}}\text{C-CH}_3$$

The so-called peroxide effect for the abnormal addition of hydrogen bromide does not take place in the case of this type of olefin.

From the organic beryllium compound with a quaternary carbon atom mentioned further above, the bromide $$\underset{\text{C}_2\text{H}_5\ \text{C}_2\text{H}_5}{\overset{\text{C}_4\text{H}_9}{>}}\text{C-CH}_2\text{Br}$$

can be obtained, which is only difficulty accessible in other ways, or with carbon dioxide the acid $$\underset{\text{C}_2\text{H}_5\ \text{C}_2\text{H}_5}{\overset{\text{C}_4\text{H}_9}{>}}\text{C-CH}_2.\text{COOH}$$

can be produced. Finally, reference may here be made to the conversion of the addition products of the invention with mercury or cadmium or zinc dihalides, which follows the equations: $AlR_3 + 3HgCl_2 = AlCl_3 + 3Cl.Hg.R$; $AlR_3 + 3CdCl_2 = AlCl_3 + 3Cl.Cd.R$;

$$AlR_3 + 3ZnCl_2 = AlCl_3 + 3Cl.Zn.R$$

and gives compounds, of which those of mercury are distinguished by bactericidal and fungicidal properties, whereas those of zinc and cadmium can be used as intermediate products for syntheses. They are only accessible in wide range of different constituents via the substances of the invention as intermediate products.

This enumeration of the various valuable uses of the products of the process of the invention is not in any way complete.

The following examples are given to illustrate the invention and not to limit the same:

EXAMPLE 1

*Aluminum triisobutyl from aluminum hydride and isobutylene,* $AlH_3 + 3(CH_3)_2C=CH_2 = Al(CH_2.CH(CH_3)_2)_3$ 30 g. of aluminum hydride of 65% strength, containing ether, such as can be obtained by evaporating an ethereal solution of aluminum hydride and subsequently heating in vacuum and high vacuum to 60 to 70° C., are introduced in an atmosphere of nitrogen into a 500-cc. autoclave and 200 g. of completely dry isobutylene are forced in. The autoclave is heated with shaking. The reaction begins at 60 to 65° C. and is complete after six to eight hours. After blowing off excess isobutylene, the liquid crude product is forced in an atmosphere of nitrogen into a distilling flask and is distilled in vacuo. Two clearly distinguished fractions are thus obtained. Aluminum triisobutyl $Al(i-C_4H_9)_3$ distils over at 33 to 35° C. under 0.1 to 0.15 mm. Hg pressure and solidifies in a collecting vessel cooled with ice to form long colorless needles. If the vacuum is increased, aluminum triisobutyl etherate distils over at 58 to 59° C. at $10^{-3}$ mm. pressure as a colorless liquid. The yield consists of 64 g. $Al(i-C_4H_9)_3$ and 51 g. $Al(i-C_4H_9)_3$ etherate, i. e. a total of 81% of the theoretical yield.

Fraction I contains 13.70% Al, calc. for $Al(C_4H_9)_3$ 13.65% Al.

Fraction II contains 10.65% Al, calc. for $$Al(C_4H_9)_3 \cdot \tfrac{3}{4}(C_2H_5)_2O$$

10.65% Al.

Both fractions, when decomposed with water or alcohols, yield only isobutane (fraction II yields ether also) and no hydrogen.

EXAMPLE 2

*Aluminum dibutyl hydride from aluminum hydride and butene-(1),*

$$AlH_3 + 2CH_3-CH_2-CH=CH_2 = Al(C_4H_9)_2H$$

410 cc. of an ethereal 0.31 molar aluminum hydride solution are forced in an atmosphere of nitrogen into an autoclave and 14 g. of butene-(1) are condensed with them. Over a period of fourteen hours, the autoclave is brought to a temperature of 70 to 75° C.; excess gas is then let off, and the ether is distilled off in an atmosphere of nitrogen after the contents of the autoclave have been introduced into a glass flask. The residue boils in a high vacuum at 64–66° C. ($10^{-3}$ mm.).

Yield: 9.5 g., i. e., 61% of the theoretical.

Analysis: 19.2% Al found; 19.0% Al calculated for $Al(C_4H_9)_2H$.

When the product is decomposed—preferably with a high boiling alcohol, for example 2-ethyl hexanol, to render more gentle the otherwise very stormy reaction— 450 cc. of gas (measured at 0° C. and 760 mm. Hg pressure) are obtained per gram of substance employed instead of the calculated 472 cc. The gas consists exactly of one-third hydrogen and two-thirds n-butane.

EXAMPLE 3

*Lithium aluminum tri-n-hexyl from lithium aluminum hydride and alpha-hexene,*

$$LiAlH_4 + 4CH_2{:}CH.(CH_2)_3.CH_3 = LiAl(C_6H_{13})_3$$

3 g. of lithium aluminum hydride as free from ether and of as high a strength as possible are heated for five hours to 110° C. in a suitable autoclave in an atmosphere of nitrogen with 45 cc. of hexene-(1) or with a correspondingly greater quantity of a hexene mixture containing hexene-(1), which mixture may also contain other hydrocarbons, especially saturated hydrocarbons, for example, hexane. The autoclave is then filled with a pasty mass which is stirred after cooling with hexane in an atmosphere of nitrogen, and transferred to a glass flask from which the hexane is then distilled off, finally in a high vacuum at 60° C. There remain behind barely 30 g. (theoretical yield 30.6 g.)—the exact quantity depends on the degree of purity of the lithium aluminum hydride employed—of a solid salt-like, white residue of the composition $LiAl(C_6H_{13})_4$, for example, Found: Al 7.22%, Li 1.87%. Calc.: Al 7.8%, Li 1.95%.

On decomposition with water, or better, with ethyl hexanol, practically no gas is liberated, in particular no hydrogen.

The compound can be converted very readily into pure aluminum trihexyl by suspending it in dry hexane in an atmosphere of nitrogen, adding finely powdered aluminum chloride in a quantity corresponding to the equation

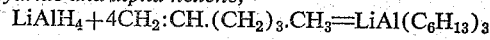
$$3LiAl(C_6H_{13})_4 + AlCl_3 = 3LiCl + 4Al(C_6H_{13})_3$$

and thereafter stirring and warming gently. After filtering off and centrifuging off the lithium chloride, the hexane is distilled off and the residue is subjected to a short-path distillation in a very high vacuum. At a bath temperature of 120° C., a colorless liquid passes over:

Calc.: Al 9.57%. Found: Al 9.782%.

Lithium aluminum tetraoctyl can be obtained in an analogous manner from octene-(1), but this can be boiled in an open vessel under reflux (and in an atmosphere of nitrogen) (B. P. 110 to 120° C.).

EXAMPLE 4

*Sodium aluminum tetrapropyl from sodium aluminum tripropyl hydride and propylene,*

$$C_3H_6 + NaAlH(C_3H_7)_3 = NaAl(C_3H_7)_4$$

153 g. of aluminum tri-n-propyl are dissolved in 500 cc. of dry air-free hexane and a fine suspension of 24 g. of sodium hydride in 150 cc. of hexane is then added in an atmosphere of nitrogen. The hydride dissolves and the solution heats up by itself. Finally, the solution is heated for some time to 50 to 60° C. The solution is then introduced into a suitable autoclave, 50 to 60 g. of propylene are forced in, and the autoclave is heated for twenty-four hours to 150° C. After cooling, the excess propylene is let off and the almost clear solution is forced out with nitrogen. After removal of the hexane from the clear solution, 145 g. of an oily residue remain, which crystallize slowly.

$NaAl(C_3H_7)_4$: Calc., Na 10.4; Al 12.2. Found, Na 10.3; Al 11.8.

The product on decomposition with ethyl hexanol gives only propane, but no hydrogen. The product can be converted into aluminum tripropyl in a manner analogous to that described in Example 3.

EXAMPLE 5

*Aluminum diethyl sec.-amyl by addition of aluminum diethyl hydride to pentene-(2)*

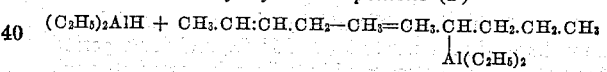

36 g. of dry air-free pentene-(2) are introduced together with 17.6 g. of $Al(C_2H_5)_2H$ in an atmosphere of nitrogen into a glass ampoule of approximately 150 cc. volume and the ampoule is then fused to seal it. The ampoule is then heated (preferably in an autoclave filled with pentane) for six days to 70° C. After cooling, the ampoule is opened and the excess pentene-(2) (23.0 g.) is distilled off. The residue weighs 31 g., i. e., shows an increase in weight of 13.4 g. instead of 14 g. The distillation residue is distilled in a high vacuum. B. P. 43 to 45° C. ($10^{-3}$ mm. Hg), $d_4^{20} = 0.850$.

Yield: (excluding a small first running of $(C_2H_5)_2AlH$) 24 g. $(H_5C_2)_2Al(C_5H_{11})$, i. e. 75% of the theoretical.

Analysis: (a) Found: 17.45% Al. Calc.: 17.30% Al. On decomposition with ethyl hexanol, the product yields the correct quantity of ethane (2 mols) besides pentane, but no hydrogen.

The aluminum diethyl hydride required for this experiment is preferably obtained by treating an ethereal solution of diethyl aluminum chloride $(C_2H_5)_2AlCl$ with finely powdered lithium hydride, filtering, distilling off the ether and subjecting the residue to distillation in a high vacuum. It is a colorless spontaneously inflammable liquid of B. P. 55 to 56° C./$10^{-3}$ mm. Hg pressure, $d_4^{20} = 0.8081$, $n_D^{20} = 1.47396$.

EXAMPLE 6

*Addition of aluminum diethyl hydride to dicyclopentadiene*

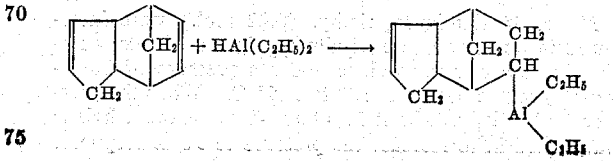

4.9 g. of aluminum diethyl hydride with 13.85 g. of dicyclopentadiene are sealed in a glass flask by fusing it, and heated for seven hours to 65° C. After cooling, the neck of the ampoule is opened in an atmosphere of very pure nitrogen and a sample is decomposed with ethyl hexanol. The gas evolved no longer contains hydrogen. After removal of the excess dicyclopentadiene in a high vacuum, a viscous oily residue is obtained, which consists substantially of the addition product of dicyclopentadiene and diethyl aluminum hydride of the formula given above. On decomposing this compound with water, the known dihydrocyclopentadiene is obtained:

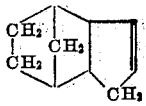

EXAMPLE 7

Partial reduction of dimethyl fulvene 1.9 g. of lithium aluminum hydride are dissolved in ether, and 5.3 g. of dimethyl fulvene are added drop by drop. Even at room temperature, the reaction begins with spontaneous heating up and the color becomes lighter. Finally, the reaction becomes colorless, and a white, cheesy mass deposits. Aluminum diethyl hydride shows a similar reaction when dimethyl fulvene is added to it in a molecular proportion of 1:1. The reaction in this case can be detected by the great increase in viscosity.

If 5 N HCl is added with ice-cooling to the product obtained in either of these ways, an oil separates, which is of a much lighter color than dimethyl fulvene, and boils at 28° C. (11 mm.). It has the composition of an isopropylcyclopentadiene (dihydrodimethylfulvene).

$C_8H_{12}$: Calc., C 88.8; H 11.2. Found, C 88.4; H 11.1.

EXAMPLE 8

Aluminum diethyl hydride and butadiene 5.7 g. of aluminum diethyl hydride are heated in an atmosphere of nitrogen to 90 to 95° C., and for a period of sixteen hours a stream of butadiene is passed through at a rate of 2 to 3 g. per hour, which leads to the absorption of a part only of the butadiene. After cooling, the dissolved butadiene is first driven off and the residue is then distilled in a high vacuum. A distillate is obtained containing approximately 19% Al instead of 19.3%, which is the calculated quantity for $(H_7C_4)Al(C_2H_5)_2$ and also a non-distillable residue which gives both ethane and butane on decomposition with water and consists mainly of $(C_2H_2)_2Al.CH_2.CH_2.CH_2.CH_2Al(C_2H_2)_2$

EXAMPLE 9

Addition of aluminum diethyl hydride to styrene 7.3 g. of aluminum diethyl hydride are mixed in a glass ampoule with 8.9 g. of styrene distilled over sodium, the ampoule is sealed by fusing it, and the reaction mixture is heated for twenty-four hours to 65° C. A contraction of volume of 8.4% takes place, and the mixture becomes viscous. The fact that the viscous product on decomposition with water yields only ethyl benzene besides ethane, shows that the product does not contain a styrene polymer, but really contains an addition product of the type $C_6H_5.CH_2.CH_2.Al(C_2H_5)_2$

EXAMPLE 10

Addition of ethylene to aluminum triethyl 30 cc. of aluminum triethyl (0.22 mol.) were introduced in an atmosphere of nitrogen into a 200 cc. autoclave together with ethylene under a pressure of 60 atmospheres and heated to 120 to 125° C. When the pressure had fallen to about 20 atmospheres, more ethylene was forced in to increase the pressure to 90 atmospheres and the procedure was again repeated. After six hours in all 40 g. of ethylene were taken up in this way, and the contents of the autoclave consisted of 90 cc. of a clear colorless liquid from which 17 cc. were distilled off in a high vacuum at a bath temperature rising to 130° C. On decomposition with water, the product gave mixtures of ethane and butane, i. e., consisted of mixtures of aluminum trialkyls $Al(C_nH_{2n}+1)_3$ where $n=2$ and 4.

Methanol was added cautiously with cooling to the residue, which contained the higher aluminum compounds, whereupon 50 cc. of liquid hydrocarbons were obtained in addition to 3.9 liters of gas.

The gas consisted of 90% butane and 10% ethane.

On distillation with an analytical rotary band column, the liquid gave 12 cc. n-hexane, B. P. 69° C./760 mm.
13.5 cc. n-octane, B. P. 125° C./760 mm.
9.0 cc. n-decane, B. P. 76° C./26 mm.
4.2 cc dodecane, B. P. 110° C./26 mm.
3.6 cc. residue All the odd number hydrocarbons from pentane to undecane and n-tridecane can be obtained in a comparable experiment starting from aluminum tripropyl

EXAMPLE 11

Mixture of aluminum alkyls and $HgCl_2$ 10 cc. (0.07 mol.) $Al(C_2H_5)_3$ were introduced in an atmosphere of nitrogen together with 30 g. of ethylene into an 0.2 liter autoclave and heated for ten hours to 110 to 115° C. The reaction mixture was then allowed to cool and the excess ethylene was blown off in the cold. 18 g. of ethylene were taken up. 100 cc. of dry air-free cyclohexane were then added to the contents of the autoclave and heated to bring about solution, and the solution was then forced out of the autoclave with nitrogen. This solution was added drop by drop over a period of 30 minutes to a stirred suspension of 59.5 g. $HgCl_2$ and 145 cc. of cyclohexane and the mixture was then heated for a further hour to 80° C. The compound precipitated was filtered off with suction and then fused with 1% hydrochloric acid on the water bath, then washed repeatedly with water, and after drying, recrystallized from butanol.

A solid, salt-like, white product was obtained of the type $H(C_2H_4)_nHgCl$, where $n=4-5$, and a mercury content of approximately 50 to 55% and a chlorine content of 9 to 10%.

EXAMPLE 12

Aluminum triethlyl and octene-(1)

14.5 cc. of octene-(1) and 12.5 cc. of aluminum triethyl were heated in an autoclave in an atmosphere of nitrogen for sixteen hours to 132° C., the autoclave was then cooled, the contents were then emptied out in an atmosphere of nitrogen, and heated in vacuo (12 mm.) to a maximum temperature of 135° C., whereupon approximately 5 cc. distilled over.

In order to elucidate the nature of the reaction product produced, methanol and thereafter dilute hydrochloric acid were added to the distillation residue with cooling, whereupon 11 cc. of a colorless oil were obtained. This gave, after a first running of a hydrocarbon of the $C_8$ series, 5.5 cc. of the hydrocarbon

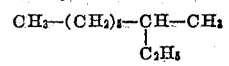

which can only have been produced from a compound containing the group

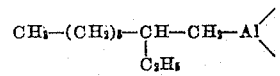

The hydrocarbon shows the following characteristics: $n_D^{20}=1.4132$. B. P. 760=165° C.

It does not solidify until it reaches a temperature of

13

−80° C. n-Decane boils at a temperature of approximately 10° C. higher and has a melting point of −30° C.

EXAMPLE 13

*Addition of beryllium diethyl to 2-methyl-pentene-(1)*

2.6 g. (0.039 mol.)=3.5 cc. of beryllium diethyl and 11.5 g. (0.137 mol.)=17 cc. of 2 methyl-pentene-(1),

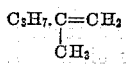

are sealed in a glass ampoule by fusing it and heated for eighty-two hours to 100° C. The course of the reaction can be followed by observing the contraction of the mixture. This amounts to 0.43 cc. in all, and remains constant after the above-quoted period.

Aliquot parts of the mixture, when cautiously decomposed with 2-ethyl hexanol, liberate exactly half the quantity of ethane which would be obtained from unchanged beryllium diethyl. The reaction

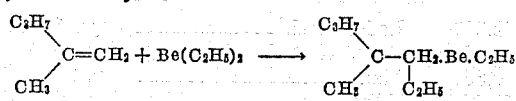

has clearly taken place. This is confirmed by the fact that, on distilling off the excess methyl pentene on a boiling water bath, finally in a weak vacuum, 5.9 g. of a residue remain, which corresponds exactly to 0.039 mol. of this addition product.

We claim:

1. In the production of organic compounds of aluminum and beryllium the improvement which comprises heating with an olefinic hydrocarbon having at least one unsaturated bond a metal compound having the grouping $$Me(R)_n$$

in which Me is a metal selected from the group consisting of aluminum and beryllium, R is at least one member including the same and different members selected from the group consisting of hydrogen, aliphatic radicals, aromatic radicals and combinations thereof including aralkyl and cycloalkyl radicals, and $n$ is the valence of the metal Me, said heating being effected to a temperature below the temperature of decomposition and secondary changes of the reactants for a period of time sufficient to obtain addition products containing the olefinic hydrocarbons in whole number stoichiometric proportions of 1 to 6 per metal equivalent, and recovering the addition compound of the reactants.

2. The improvement according to claim 1 in which said metal compound is present in the form of a molecule compound with an ether.

3. The improvement according to claim 1 in which said metal compound is present in the form of a complex compound with an alkali metal hydride.

4. The improvement according to claim 1 in which said metal compound is present in the form of a complex compound with an alkali metal alkyl.

5. The improvement according to claim 1 in which said metal compound is present in the form of a complex compound with an alkali metal aryl.

6. The improvement according to claim 1 in which said heating and contacting is effected in the presence of an organic solvent.

7. The improvement according to claim 6, in which said solvent is an ether.

8. The improvement according to claim 1, in which said heating is effected under pressure.

9. The improvement according to claim 1, in which said olefinic hydrocarbon is an aliphatic olefin with an end positioned double bond.

10. The improvement according to claim 9, in which said olefin is ethylene.

11. The improvement according to claim 1, in which said olefinic hydrocarbon is an aliphatic olefin with at least two double bonds.

12. The improvement according to claim 1, in which said olefinic hydrocarbon is an aralkylene.

13. The improvement according to claim 1, in which said olefinic hydrocarbon is a hydro-aralkylene.

14. The improvement according to claim 1, in which said olefinic hydrocarbon is an isocyclic hydrocarbon with at least one double bond.

15. In the production of organo aluminum compounds the improvement which comprises heating an aluminum hydride with an olefinic hydrocarbon, having the vinylidene radical

to a temperature below the temperature of decomposition and secondary changes of the reactants and for a period of time sufficient to obtain addition products containing the olefinic hydrocarbons in whole number stoichiometric proportions of 1 to 6 per metal equivalent, and recovering the addition compound of the reactants.

16. The improvement according to claim 15 in which said olefinic hydrocarbon is a non-symmetrical one carrying different hydrocarbon substituents at said radical.

17. The improvement according to claim 15 in which said heating is effected at a temperature of about 50–120° C. until three mols of said olefinic hydrocarbon are added, the mixture being cooled and an aluminum trialkyl recovered.

18. The improvement according to claim 17 in which said aluminum hydride is solid aluminum hydride and in which the addition compound is recovered by removing unreacted olefinic hydrocarbon from the reaction mixture and subjecting the same to distillation.

19. The improvement according to claim 15 in which said metal compound is an ether containing aluminum hydride, and in which aluminum trialkyl etherate is recovered by evaporating solvent and remaining unreacted olefin after the heating and by distillation.

20. The improvement in accordance with claim 15 in which said olefinic hydrocarbon is one corresponding to the general formula

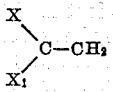

for which X is an aromatic hydrocarbon radical and for which $X_1$ is one member selected from the group consisting of hydrogen and aromatic hydrocarbon radicals.

21. The improvement according to claim 15 in which said olefinic hydrocarbon is one corresponding to the general formula

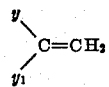

for which $y$ is a non-aromatic isocyclic six-membered ring hydrocarbon radical and for which $y_1$ is one member selected from the group consisting of hydrogen and non-aromatic isocyclic radicals.

22. The improvement according to claim 15 in which said olefinic hydrocarbon is one corresponding to the general formula

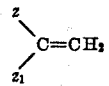

for which $z$ and $z_1$ is at least one member selected from the group consisting of hydrogen and saturated aliphatic hydrocarbon radicals, and in which said heating is effected under pressure.

23. The improvement according to claim 22 in which $z$ and $z_1$ are dissimilar saturated aliphatic radicals.

24. The improvement according to claim 1 in which said metal compound is a solid aluminum hydride which has been freed from ether prior to said heating by boiling with an indifferent solvent with continuous withdrawal and replacement of the distillate.

25. The improvement according to claim 24 in which said indifferent solvent is selected from the group consisting of saturated and aromatic hydrocarbons having a boiling range of about 40–80° C. at a pressure not in excess of normal.

26. The improvement according to claim 1 in which said metal compound is aluminum hydride, in which said heating is effected at a temperature of about 50–120° C. until from 1 to 2 mols of said olefin are added to each mol of aluminum present, in which the reaction mixture is thereafter cooled and subjected to distillation and in which a substituted aluminum hydride is recovered having the general formula

in which R' is a hydrocarbon radical and R" is a member selected from the group consisting of hydrogen and hydrocarbon radicals.

27. The improvement according to claim 1 in which said metal compound is a substituted aluminum hydride having the general formula

in which R' is a hydrocarbon radical and R" is a member selected from the group consisting of hydrogen and hydrocarbon radicals.

28. In the production of organo aluminum compounds the improvement which comprises heating an aluminum trialkyl at a temperature of about 50–120° C. with an olefinic hydrocarbon having the terminal radical

for a period of time sufficient to obtain addition products containing the olefinic hydrocarbons in whole number stoichiometric proportions of 1 to 6 per metal equivalent, and recovering the addition compound of the reactants.

29. In the production of organo beryllium compounds, the improvement which comprises heating a beryllium dialkyl with a non-symmetrical olefinic hydrocarbon of the general formula

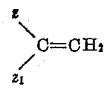

for which $z$ and $z_1$ are dissimilar saturated aliphatic radicals.

30. The improvement according to claim 1 in which said metal compound is diethyl aluminum hydride, said olefinic hydrocarbon ethylene and said addition compound of the reactants aluminum triethyl.

31. The improvement according to claim 1 in which said metal compound is an ethyl aluminum hydride, said olefinic hydrocarbon ethylene and said addition compound of the reactants aluminum triethyl.

References Cited in the file of this patent

UNITED STATES PATENTS

| | | |
|---|---|---|
| 2,052,889 | Loder et al. | Sept. 1, 1936 |
| 2,221,000 | Kventzel et al. | Nov. 12, 1940 |
| 2,229,661 | Mann | Jan. 28, 1941 |
| 2,263,666 | Wilson | Nov. 25, 1941 |
| 2,299,716 | Van Peski | Oct. 20, 1942 |
| 2,385,543 | Ross et al. | Sept. 25, 1945 |
| 2,413,531 | Verbanc | Dec. 31, 1946 |
| 2,421,090 | Smith et al. | May 27, 1947 |
| 2,510,765 | Stewart | June 6, 1950 |
| 2,567,972 | Schlesinger et al. | Sept. 18, 1951 |
| 2,579,251 | Coates et al. | Dec. 18, 1951 |
| 2,786,860 | Ziegler et al. | May 13, 1952 |

OTHER REFERENCES

Finholt et al.: J. Am. Chem. Soc., vol. 69, pages 1199–1203, (1947).

Nystrom et al.: J. Am. Chem. Soc., vol. 69, pages 1197–1999, (1947).

Trevoy et al.: J. Am. Chem. Soc., vol. 71, pages 1675–1678, (May 1949).

Sidgwick: Chemical Elements and Their Compounds, vol. I, page 414, Oxford Univ. Press, London (1950).

Schechter et al.: Boron Hydrides and Related Compounds, page 29, prepared for Dept. of Navy, Bureau of Aeronautics by Callery Chemical Co. (March 1951).

Hurd: Chemistry of the Hydrides, page 87, New York, John Wiley & Sons, Inc., (June 1952).

UNITED STATES PATENT OFFICE
Certificate of Correction

Patent No. 2,826,598                      March 11, 1958

Karl Ziegler et al.

It is hereby certified that error appears in the printed specification of the above numbered patent requiring correction and that the said Letters Patent should read as corrected below.

Column 1, line 57, for "of beryllium" read —or beryllium—; column 2, line 5, for "everal" read —Several—; column 5, line 58, for "group" read —groups—; column 14, lines 42 to 45, the formula should appear as shown below instead as as in the patent—

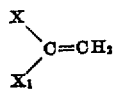

Signed and sealed this 20th day of May 1958.

[SEAL]

Attest:
KARL H. AXLINE,
*Attesting Officer.*

ROBERT C. WATSON,
*Commissioner of Patents.*